United States Patent
Gimkiewicz et al.

(10) Patent No.: US 12,137,747 B2
(45) Date of Patent: *Nov. 12, 2024

(54) ELECTRICALLY OPERATED SMOKING DEVICE INCLUDING A COMPACT SYSTEM FOR IDENTIFYING SMOKING ARTICLES IN THE DEVICE

(71) Applicant: Philip Morris Products S.A., Neuchatel (CH)

(72) Inventors: Christiane Gimkiewicz, Ismaning Bei Muenchen (DE); Rolf Eckert, Neuchatel (CH); Edoardo Franzi, Cheseaux-Noreaz (CH); David Hasler, Neuchatel (CH); Ross Stanley, Epalinges (CH)

(73) Assignee: Philip Morris Products S.A., Neuchatel (CH)

( * ) Notice: Subject to any disclaimer, the term of this patent is extended or adjusted under 35 U.S.C. 154(b) by 176 days.

This patent is subject to a terminal disclaimer.

(21) Appl. No.: 17/497,411

(22) Filed: Oct. 8, 2021

(65) Prior Publication Data

US 2022/0022548 A1 Jan. 27, 2022

Related U.S. Application Data

(63) Continuation of application No. 15/735,688, filed as application No. PCT/EP2016/067888 on Jul. 27, 2016, now Pat. No. 11,166,494.

(30) Foreign Application Priority Data

Aug. 14, 2015 (EP) .................................. 15181085

(51) Int. Cl.
*G06K 7/10* (2006.01)
*A24D 1/20* (2020.01)
(Continued)

(52) U.S. Cl.
CPC ................ *A24F 40/53* (2020.01); *A24D 1/20* (2020.01); *A24F 40/40* (2020.01); *A24F 40/51* (2020.01);
(Continued)

(58) Field of Classification Search
CPC ...... A24F 40/51; G02B 3/005; G06K 7/10732
See application file for complete search history.

(56) References Cited

U.S. PATENT DOCUMENTS

| | | | |
|---|---|---|---|
| 5,060,671 | A | 10/1991 | Counts et al. |
| 5,388,594 | A | 2/1995 | Counts et al. |

(Continued)

FOREIGN PATENT DOCUMENTS

| | | |
|---|---|---|
| CN | 2586215 Y | 11/2003 |
| CN | 1550820 A | 12/2004 |

(Continued)

OTHER PUBLICATIONS

Israeli Office Action issued Oct. 18, 2021 in Israeli Patent Application No. 255518 (with English translation), 8 pages.
(Continued)

*Primary Examiner* — Russell E Sparks
(74) *Attorney, Agent, or Firm* — Oblon, McClelland, Maier & Neustadt, L.L.P.

(57) ABSTRACT

An electrically operated smoking device configured to receive a smoking article is provided, including: a housing defining a cavity configured to at least partially receive the smoking article; and an image sensor configured to detect indicia on the smoking article, the image sensor being disposed on a periphery of the cavity and including a light source, an image detector, and a plurality of microlenses held in a support structure, the plurality of microlenses being configured to provide a mosaic of inverted images on the image detector. A smoking system is also provided.

18 Claims, 4 Drawing Sheets

(51) Int. Cl.
  *A24F 40/40*   (2020.01)
  *A24F 40/51*   (2020.01)
  *A24F 40/53*   (2020.01)
  *G02B 3/00*    (2006.01)
  *G06K 7/12*    (2006.01)
  *A24F 40/20*   (2020.01)

(52) U.S. Cl.
  CPC .......... *G06K 7/10732* (2013.01); *G06K 7/12* (2013.01); *A24F 40/20* (2020.01); *G02B 3/005* (2013.01)

(56)           References Cited

U.S. PATENT DOCUMENTS

| | | | |
|---|---|---|---|
| 5,505,214 | A | 4/1996 | Collins et al. |
| 6,018,422 | A * | 1/2000 | Feldman ................ G02B 23/00 430/394 |
| 6,540,392 | B1 * | 4/2003 | Braithwaite ........... G06V 40/19 362/800 |
| 7,572,026 | B2 * | 8/2009 | Park .................... H01L 25/0753 362/97.3 |
| 7,605,857 | B2 | 10/2009 | Kim |
| 8,628,014 | B1 | 1/2014 | Hoffer, Jr. |
| 8,689,804 | B2 | 4/2014 | Fernando et al. |
| 8,718,319 | B2 | 5/2014 | Silver |
| 9,894,932 | B2 * | 2/2018 | Liu ....................... H05B 1/0244 |
| 10,236,708 | B2 * | 3/2019 | Schennum ........... B65D 43/163 |
| 10,668,638 | B2 | 6/2020 | Mayes |
| 10,820,626 | B2 | 11/2020 | Benjamignan et al. |
| 11,166,494 | B2 * | 11/2021 | Gimkiewicz ........... A24F 40/51 |
| 2005/0172954 | A1 | 8/2005 | Smith et al. |
| 2006/0091209 | A1 | 5/2006 | He |
| 2006/0202104 | A1 | 9/2006 | Gurevich et al. |
| 2008/0127987 | A1 * | 6/2008 | Twelftree ............. A24C 5/3406 131/185 |
| 2013/0306084 | A1 | 11/2013 | Flick |
| 2014/0305449 | A1 | 10/2014 | Plojoux et al. |
| 2015/0013696 | A1 | 1/2015 | Plojoux et al. |
| 2015/0178536 | A1 | 6/2015 | Hennick et al. |
| 2016/0262451 | A1 | 9/2016 | Liu |
| 2017/0174375 | A1 * | 6/2017 | Ek .......................... A24F 23/02 |

FOREIGN PATENT DOCUMENTS

| | | | | | |
|---|---|---|---|---|---|
| CN | | 2681352 | Y | 2/2005 | |
| CN | | 101183288 | A | 5/2008 | |
| CN | | 101751154 | A | 6/2010 | |
| CN | | 201497957 | U | 6/2010 | |
| CN | | 102264251 | A | 11/2011 | |
| CN | | 102375294 | A | 3/2012 | |
| CN | | 102578706 | A | 7/2012 | |
| CN | | 102681046 | A | 9/2012 | |
| CN | | 103704886 | A | 4/2014 | |
| CN | | 103777256 | A | 5/2014 | |
| CN | 203 | 646 504 | U | 6/2014 | |
| CN | | 103889257 | A | 6/2014 | |
| CN | | 103974640 | A | 8/2014 | |
| CN | | 103997922 | A | 8/2014 | |
| CN | | 203986093 | U | 12/2014 | |
| EP | | 1891567 | A2 | 2/2008 | |
| EP | 2 | 468 118 | A1 | 6/2012 | |
| EP | 2 | 750 374 | A1 | 7/2014 | |
| EP | | 3066939 | A1 | 9/2016 | |
| JP | | 4-330850 | A | 11/1992 | |
| JP | | 2001-157664 | A | 6/2001 | |
| JP | | 2012-513750 | A | 6/2012 | |
| JP | | 2014-533513 | A | 12/2014 | |
| KR | | 10-2011-0096548 | A | 8/2011 | |
| KR | | 10-2012-0064327 | A | 6/2012 | |
| KR | | 10-2014-0106711 | A | 9/2014 | |
| KR | | 10-2014-0116055 | A | 10/2014 | |
| RU | 2 | 517 125 | C2 | 5/2014 | |
| WO | | 2010/073122 | A1 | 7/2010 | |
| WO | | WO-2013076098 | A2 * | 5/2013 | .......... A24B 15/167 |
| WO | | 2013/098395 | A1 | 7/2013 | |
| WO | | 2014/150898 | A3 | 12/2014 | |
| WO | | 2015/035674 | A1 | 3/2015 | |
| WO | | 2015/078085 | A1 | 6/2015 | |
| WO | | 2015/082560 | A1 | 6/2015 | |

OTHER PUBLICATIONS

"Microlens" Wikipedia, Jul. 13, 2015, 4 pages.
Fill Factor (Image Sensor) Wikipedia, Jun. 6, 2014, 1 page.
Chen Sihai et al., "Technique for Monolithic Fabrication of Microlens Arrays Integrated with Infrared CCD" Chinese Journal of Lasers, vol. B11, No. 5, Oct. 2002, pp. 356-358.
U.S. Appl. No. 15/735,688, filed Dec. 12, 2017, 2019/0261682 A1, Christian Gimkiewicz, et al.
International Search Report and Written Opinion issued Oct. 21, 2016 in PCT/EP2016/067888, filed Jul. 27, 2016.
Combined Russian Office Action and Search Report issued on Oct. 29, 2019, in Patent Application No. 2017145214, 17 pages (with English translation).
Combined Chinese Office Action and Search Report issued on Mar. 12, 2020, in Patent Application No. 201680040686.4 (with English translation), 16 pages.
Notice of Grounds for Rejection issued Sep. 23, 2020 in Japanese Patent Application No. 2018-506520 (with English language translation), 7 pages.
Chinese Office Action issued Dec. 22, 2020 in corresponding Chinese Patent Application No. 201680040686.4 (with English translation), 19 pages.
Andreas Brueckner, "Microoptical Multi Aperture Imaging Systems", PhD Dissertation, Aug. 1980, 142 pages.
VARJO, et al., "Direct Imaging with Printed Microlens Arrays", 21st International Conference on Pattern Recognition (ICPR 2012) Nov. 11-15, 2012, p. 1355-1358.
Tanida, et al., "Thin observation module by bound optics (TOMBO): concept and experimental verification", Applied Optics vol. 40, No. 11, Apr. 10, 2001, p. 1806-1813.
Nussbaum et al., "Design, fabrication and testing of microlens arrays for sensors and microsystems", Pure Appl. Opt. 6, Aug. 8, 1997, p. 617-636.
Optics: Microlenses make miniaturized closeup imaging a reality, https://www.vision-systems.com/home/article/16737870/optics-microlenses-make-miniaturized-closeup-imaging-a-reality. Vision Systems Design (Year:2012).
Chinese Office Action issued May 11, 2023 in Chinese Patent Application No. 201680040686.4 (with English Translation), 12 pages.
Chinese Office Action issued Jul. 25, 2023 in Chinese Patent Application No. 201680040686.4, 11 pages.
Korean Office Action issued Jul. 3, 2023 in Korean Patent Application No. 10-2017-7037926 (with English Translation), 10 pages.

* cited by examiner

ELECTRICALLY OPERATED SMOKING
DEVICE INCLUDING A COMPACT SYSTEM
FOR IDENTIFYING SMOKING ARTICLES IN
THE DEVICE

CROSS-REFERENCE TO RELATED APPLICATIONS

This application is a continuation application of and claims benefit under 35 U.S.C. § 120 to U.S. application Ser. No. 15/735,688, filed on Dec. 12, 2017, which is a U.S. national stage application of PCT/EP2016/067888, filed on Jul. 27, 2016, and claims benefit of priority under 35 U.S.C. § 119 to EP 15181085.0, filed on Aug. 14, 2015, the entire contents of each of which are incorporated herein by reference.

TECHNICAL FIELD

The present invention relates to electrically operated smoking devices which receive smoking articles in use. In particular, the invention relates to electrically operated smoking devices that are able to recognise a smoking article inserted into the device by imaging indicia on the smoking article.

DESCRIPTION OF THE RELATED ART

A number of prior art documents, such as U.S. Pat. Nos. 5,060,671A, 5,388,594 and 5,505,214, disclose electrically operated smoking systems that heat rather than burn an aerosol-forming substrate. These systems operate to heat the substrate to a temperature at which desirable volatile compounds are released but maintain the temperature below a temperature at which combustion might occur.

Because the flavours are generated and released by a controlled heating of the aerosol-forming substrate, without the combustion that takes place in lit-end cigarettes, smoking articles developed for electrically heated smoking systems are typically specially designed for a particular smoking system. The structure of a smoking article designed for an electrically heated smoking system is different from the structure of a lit-end smoking article. Using a lit-end smoking article with an electrically heated smoking system may result in a poor smoking experience for the user, and may also damage the system. For example, the smoking article may have insufficient moisture content to be compatible with the smoking device. In addition, there may be a number of different smoking articles which are each configured for use with the system, but which each provide a different smoking experience for the user and may require heating to a different temperature.

Counterfeiting of smoking articles is also a problem. Counterfeit smoking articles may be of inferior quality or may not be suited to a smoking system at all.

There is therefore a need for a smoking system that is able to distinguish between different smoking articles and to identify smoking articles that are suitable or unsuitable for use with the smoking system. However, although it is desirable that the system identifies and does not operate with unsuitable smoking articles, it is also important that the smoking system does not erroneously reject articles that are suitable for use with the system. Users would quickly become dissatisfied with a system that frequently rejects correct smoking articles.

WO2010/073122 discloses a system in which indicia, such as a printed barcode, on the smoking article are sensed by an optical sensor in order to distinguish between different smoking articles.

It is desirable that any sensing system of the type described in WO2010/073122 does not significantly impact the size of the smoking system, the power consumption of the smoking system or the cost of the smoking system. At the same time the sensing system must be reliable and have sufficient resolving power to recognize printed patterns on small smoking articles. The fact that smoking articles tend to be shaped like lit-end cigarettes, means that the indicia must generally be marked on a curved surface. This makes imaging the pattern more difficult.

SUMMARY

It is an object of the invention to provide a smoking device with a sensing system that is able to identify smoking articles, that is compact and has low power consumption but that is reliable and minimizes false rejection of correct smoking articles.

In a first aspect of the invention, there is provided an electrically operated smoking device configured to receive a smoking article, comprising: a housing defining a cavity for at least partially receiving the smoking article; and a sensing system for detecting indicia on the smoking article, the sensing system positioned on a periphery of the cavity and comprising a light source, an image detector, and a plurality of microlenses positioned on the image detector.

BRIEF DESCRIPTION OF THE DRAWINGS

Examples of the invention will now be described in detail with reference to the accompanying drawings, in which.

DETAILED DESCRIPTION

Figure 1:
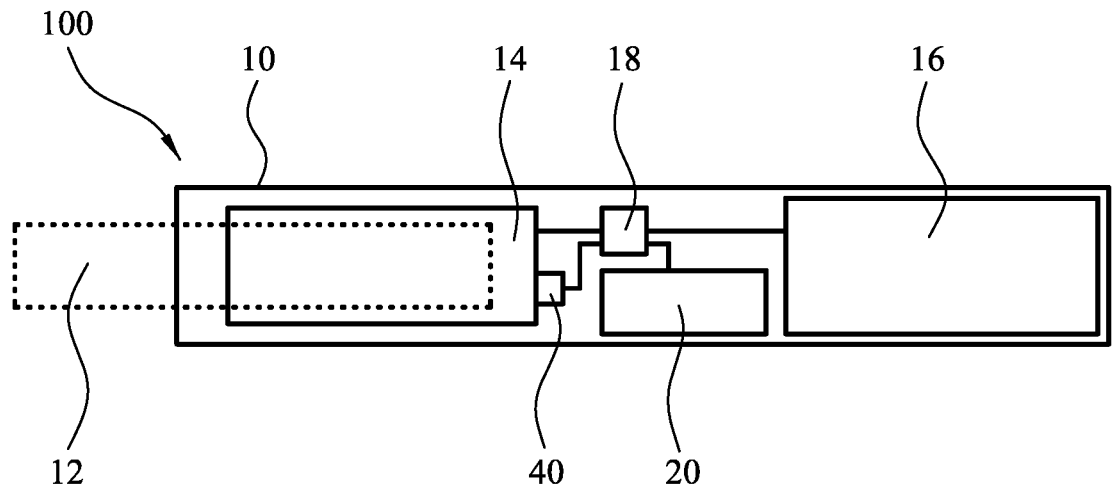
FIG. 1 is a schematic diagram of an aerosol generating device.

The use of a plurality of microlenses on the image detector allows for a thin sensing system to be made, as the distance between the microlenses and detector can be made small. This is advantageous in a handheld device.

A microlens is a small lens, generally with a diameter less than a millimetre (mm).

The image detector may comprise a plurality of detectors corresponding to each of the microlenses.

The sensing system may comprise a printed circuit board (PCB) and the light source and image detector may both be positioned on the printed circuit board. This provides for a compact system. The microlenses may be held in a support structure fixed to the PCB. The sensing system may comprise an opaque shield (which may be formed by the supporting structure) between the light source and the detector. The opaque shield may prevent light from the light source directly entering sensor, without first being reflected by the smoking article.

The light source may comprise a light emitting diode (LED). The light source may comprise a plurality of LEDs. The provision of two or more separate sources of light may improve the homogeneity of the illumination of the smoking article and of resulting images captured by the detector.

The sensing system may comprise a one dimensional array of microlenses. For example, in one embodiment, the sensing system comprises a line of four microlenses on the image detector. Alternatively, the sensing system may comprise a two dimensional array or arrangement of microlenses.

The cavity may be cylindrical and may have an open end through which the smoking article is received. The cavity may have a base at an opposite end to the open end. The cavity may have a generally circular cross section to accommodate a generally circular cylindrical smoking article. If the indicia are on surface of the smoking article that is curved, the lenses may be configured to compensate for curvature of the smoking article in the image captured by the image detector. This may be achieved through the physical placement of the microlenses or through the shape of the microlenses, or through a combination of both.

The sensing assembly may be positioned on a surface of the cavity between the open end of the cavity and the base.

If a one dimensional array of microlenses is used, the array may advantageously be arranged to extend in a direction perpendicular to the axial direction of the cavity. In this context the axial direction of the cavity means a direction extending from the open end of the cavity to the base. This has been found to provide for good illumination and good resolution in the images captured by the image detector. Light sources, such as LEDs, may be positioned on either side of the array of microlenses in the axial direction of the cavity.

Alternatively, a one dimensional array of microlenses may be arranged to extend in a direction parallel to the axial direction of the cavity. Light sources, such as LEDs, may be positioned on either side of the array of microlenses, in a direction perpendicular to the axial direction of the cavity.

The image detector may be a detector capable of forming an image of the indicia. The image detector may be a complementary metal oxide semiconductor (CMOS) or charge-coupled device (CCD) based detector. Both CMOS and CCD image detectors can be integrated onto a chip on a circuit board.

The device may comprise a sliding receptacle that receives the smoking article in use and that can be moved towards the open end of the cavity when a smoking article is to be removed. The sliding receptacle may reduce the risk of the smoking article breaking during removal from the cavity. The sliding receptacle may comprise an aperture positioned to allow for light from the light source to reach the smoking article. The same or a different aperture in the sliding receptacle may allow light from the smoking article to reach the array of microlenses. Alternatively, some or all of the sliding receptacle may be transparent to allow light from the light source to reach the smoking article and return to the image detector.

The device may include an aerosol-generating element that interacts with the smoking article to produce an aerosol. The aerosol-generating element may be a heater configured to heat a smoking article when the smoking article is in the cavity. The heater may comprise an electrically resistive material. Suitable electrically resistive materials include but are not limited to semiconductors such as doped ceramics, electrically "conductive" ceramics (such as, for example, molybdenum disilicide), carbon, graphite, metals, metal alloys, and composite materials made of a ceramic material and a metallic material. Such composite materials may comprise doped or undoped ceramics. Examples of suitable doped ceramics include doped silicon carbides. Examples of suitable metals include titanium, zirconium, tantalum platinum, gold, and silver. Examples of suitable metal alloys include stainless steel, nickel-, cobalt-, chromium-, aluminium-titanium-zirconium-, hafnium-, niobium-, molybdenum-, tantalum-, tungsten-, tin-, gallium-, manganese-, gold- and iron-containing alloys, and super-alloys based on nickel, iron, cobalt, stainless steel, TIMETAL®, and iron-manganese-aluminium based alloys. In composite materials, the electrically resistive material may optionally be embedded in, encapsulated, or coated with an insulating material or vice-versa, depending on the kinetics of energy transfer and the external physicochemical properties required.

The heater may comprise an internal heating element or an external heating element, or both internal and external heating elements, where "internal" and "external" refer to the smoking article. An internal heating element may take any suitable form. For example, an internal heating element may take the form of a heating blade. The heating blade may be formed from a ceramic substrate with one or more resistive heating tracks, formed from platinum or another suitable material, deposited on one or both sides of the blade. Alternatively, the internal heater may take the form of a casing or substrate having different electro-conductive portions, or an electrically resistive metallic tube. Alternatively, the internal heating element may be one or more heating needles or rods that run through the centre of the aerosol-forming substrate. Other alternatives include a heating wire or filament, for example a Ni—Cr (Nickel-Chromium), platinum, tungsten or alloy wire or a heating plate. Optionally, the internal heating element may be deposited in or on a rigid carrier material. In one such embodiment, the electrically resistive heating element may be formed using a metal having a defined relationship between temperature and resistivity. In such an exemplary device, the metal may be formed as a track on a suitable insulating material, such as ceramic material, and then sandwiched in another insulating material, such as a glass. Heaters formed in this manner may be used to both heat and monitor the temperature of the heating elements during operation.

An external heating element may take any suitable form. For example, an external heating element may take the form of one or more flexible heating foils on a dielectric substrate, such as polyimide. The flexible heating foils can be shaped to conform to the perimeter of the cavity. Alternatively, an external heating element may take the form of a metallic grid or grids, a flexible printed circuit board, a moulded interconnect device (MID), ceramic heater, flexible carbon fibre heater or may be formed using a coating technique, such as plasma vapour deposition, on a suitable shaped substrate. An external heating element may also be formed using a metal having a defined relationship between temperature and resistivity. In such an exemplary device, the metal may be formed as a track between two layers of suitable insulating materials. An external heating element formed in this manner may be used to both heat and monitor the temperature of the external heating element during operation. The sliding receptacle may comprise a heating aperture to allow for contact between an external heating element and a smoking article in the cavity.

The heater advantageously heats the smoking article by means of conduction. The heater may be at least partially in contact with the substrate. Alternatively, the heat from either an internal or external heating element may be conducted to the substrate by means of a heat conductive element.

The device may comprise control circuitry for comparing image data from the image detector with stored image data. The control circuitry may connected with the image detector. The control circuitry may also be connected to the heater or to another aerosol-generating element. The control circuitry may control a supply of power to the aerosol-generating element dependent on the outcome of a comparison between image data from the image detector and stored image data. For example, if the image data from the image detector does not sufficiently correlate with stored image data, then the control circuitry may prevent the supply of power to the aerosol-generating element. If the image data from the image detector does sufficiently correlate with stored image data, the control circuitry may allow the supply of power to the aerosol-generating element. In other words, based on an image comparison, the control circuitry may identify if a legitimate smoking article is present in the cavity and may allow the device to operate only when a legitimate smoking article is determined to be present in the cavity. The control circuitry may operate a particular power control process depending on which stored image data the image data from the image detector most strongly correlates to. In other words, based on an image comparison, the control circuitry may identify a particular type of smoking article and may control the device in a manner that is appropriate for that smoking article. For example, different smoking articles may advantageously be heated to different temperatures to produce a desirable aerosol.

The control circuitry may comprise one or more microcontrollers. Each or the one or more microcontrollers may comprise a microprocessor, and advantageously comprises a programmable microprocessor. The control circuitry may comprise a non-volatile memory. The device may comprise an interface configured to allow for the transfer of data to and from the control circuitry from external devices. The interface may allow for the uploading of software to the control circuitry to run on the programmable microprocessor. The interface may be a wired interface, such as a micro USB port, or may be a wireless interface.

The aerosol-generating device may further comprise a power supply for supplying power to the aerosol-generating element. The power supply may be any suitable power supply, for example a DC voltage source. In one embodiment, the power supply is a Lithium-ion battery. Alternatively, the power supply may be a Nickel-metal hydride battery, a Nickel cadmium battery, or a Lithium based battery, for example a Lithium-Cobalt, a Lithium-Iron-Phosphate, Lithium Titanate or a Lithium-Polymer battery.

The smoking device is preferably a handheld aerosol-generating device that is comfortable for a user to hold between the fingers of a single hand. The smoking device may be substantially cylindrical in shape. The smoking device may have a length between about 70 mm and 120 mm. The smoking device may have a diameter between about 10 mm and 20 mm.

In a second aspect of the invention there is provided a smoking system comprising a device in accordance with a first aspect of the invention and a smoking article.

The smoking article may comprise indicia or markings on an outer surface of the smoking article. The indicia may be a pattern, such as a checkerboard pattern. Alternatively, the indicia may comprise a one dimensional barcode or a two dimensional barcode. The indicia may extend fully around a perimeter of the smoking article.

The smoking article may be substantially cylindrical in shape. The smoking article may be substantially elongate. The smoking article may have a length and a circumference substantially perpendicular to the length. The smoking article may comprise an aerosol-forming substrate. The aerosol-forming substrate may be substantially cylindrical in shape. The aerosol-forming substrate may be substantially elongate. The aerosol-forming substrate may also have a length and a circumference substantially perpendicular to the length.

The smoking article may have a total length between approximately 30 mm and approximately 100 mm. The smoking article may have an external diameter between approximately 5 mm and approximately 12 mm. The smoking article may comprise a filter plug. The filter plug may be located at the downstream end of the smoking article. The filter plug may be a cellulose acetate filter plug. The filter plug is approximately 7 mm in length in one embodiment, but may have a length of between approximately 5 mm to approximately 10 mm.

In one embodiment, the smoking article has a total length of approximately 45 mm. The smoking article may have an external diameter of approximately 7.2 mm. Further, the aerosol-forming substrate may have a length of approximately 10 mm. Alternatively, the aerosol-forming substrate may have a length of approximately 12 mm. Further, the diameter of the aerosol-forming substrate may be between approximately 5 mm and approximately 12 mm. The smoking article may comprise an outer paper wrapper. The indicia may be on the outer paper wrapper. The indicia may be printed on the outer paper wrapper. Further, the smoking article may comprise a separation between the aerosol-forming substrate and the filter plug. The separation may be approximately 18 mm, but may be in the range of approximately 5 mm to approximately 25 mm. The separation is preferably filled in the smoking article by a heat exchanger that cools the aerosol as it passes through the smoking article from the substrate to the filter plug. The heat exchanger may be, for example, a polymer based filter, for example a crimped PLA material.

The aerosol-forming substrate may be a solid aerosol-forming substrate. Alternatively, the aerosol-forming substrate may comprise both solid and liquid components. The aerosol-forming substrate may comprise a tobacco-containing material containing volatile tobacco flavour compounds which are released from the substrate upon heating. Alternatively, the aerosol-forming substrate may comprise a non-tobacco material. The aerosol-forming substrate may further comprise an aerosol former. Examples of suitable aerosol formers are glycerine and propylene glycol.

If the aerosol-forming substrate is a solid aerosol-forming substrate, the solid aerosol-forming substrate may comprise, for example, one or more of: powder, granules, pellets, shreds, spaghettis, strips or sheets containing one or more of: herb leaf, tobacco leaf, fragments of tobacco ribs, reconstituted tobacco, homogenised tobacco, extruded tobacco, cast leaf tobacco and expanded tobacco. The solid aerosol-forming substrate may be in loose form, or may be provided in a suitable container or cartridge. Optionally, the solid aerosol-forming substrate may contain additional tobacco or non-tobacco volatile flavour compounds, to be released upon heating of the substrate. The solid aerosol-forming substrate may also contain capsules that, for example, include the additional tobacco or non-tobacco volatile flavour compounds and such capsules may melt during heating of the solid aerosol-forming substrate.

As used herein, homogenised tobacco refers to material formed by agglomerating particulate tobacco. Homogenised tobacco may be in the form of a sheet. Homogenised tobacco material may have an aerosol-former content of greater than 5% on a dry weight basis. Homogenised tobacco material may alternatively have an aerosol former content of between 5% and 30% by weight on a dry weight basis. Sheets of homogenised tobacco material may be formed by agglomerating particulate tobacco obtained by grinding or otherwise comminuting one or both of tobacco leaf lamina and tobacco leaf stems. Alternatively, or in addition, sheets of homogenised tobacco material may comprise one or more of tobacco dust, tobacco fines and other particulate tobacco by-products formed during, for example, the treating, handling and shipping of tobacco. Sheets of homogenised tobacco material may comprise one or more intrinsic binders, that is tobacco endogenous binders, one or more extrinsic binders, that is tobacco exogenous binders, or a combination thereof to help agglomerate the particulate tobacco; alternatively, or in addition, sheets of homogenised tobacco material may comprise other additives including, but not limited to, tobacco and non-tobacco fibres, aerosol-formers, humectants, plasticisers, flavourants, fillers, aqueous and non-aqueous solvents and combinations thereof.

Optionally, the solid aerosol-forming substrate may be provided on or embedded in a thermally stable carrier. The carrier may take the form of powder, granules, pellets, shreds, spaghettis, strips or sheets. Alternatively, the carrier may be a tubular carrier having a thin layer of the solid substrate deposited on its inner surface, or on its outer surface, or on both its inner and outer surfaces. Such a tubular carrier may be formed of, for example, a paper, or paper like material, a non-woven carbon fibre mat, a low mass open mesh metallic screen, or a perforated metallic foil or any other thermally stable polymer matrix.

The solid aerosol-forming substrate may be deposited on the surface of the carrier in the form of, for example, a sheet, foam, gel or slurry. The solid aerosol-forming substrate may be deposited on the entire surface of the carrier, or alternatively, may be deposited in a pattern in order to provide a non-uniform flavour delivery during use.

Although reference is made to solid aerosol-forming substrates above, it will be clear to one of ordinary skill in the art that other forms of aerosol-forming substrate may be used with other embodiments. For example, the aerosol-forming substrate may be a liquid aerosol-forming substrate. If a liquid aerosol-forming substrate is provided, the aerosol-generating device preferably comprises means for retaining the liquid. For example, the liquid aerosol-forming substrate may be retained in a container. Alternatively or in addition, the liquid aerosol-forming substrate may be absorbed into a porous carrier material. The porous carrier material may be made from any suitable absorbent plug or body, for example, a foamed metal or plastics material, polypropylene, terylene, nylon fibres or ceramic. The liquid aerosol-forming substrate may be retained in the porous carrier material prior to use of the aerosol-generating device or alternatively, the liquid aerosol-forming substrate material may be released into the porous carrier material during, or immediately prior to use. For example, the liquid aerosol-forming substrate may be provided in a capsule. The shell of the capsule preferably melts upon heating and releases the liquid aerosol-forming substrate into the porous carrier material. The capsule may optionally contain a solid in combination with the liquid.

Alternatively, the carrier may be a non-woven fabric or fibre bundle into which tobacco components have been incorporated. The non-woven fabric or fibre bundle may comprise, for example, carbon fibres, natural cellulose fibres, or cellulose derivative fibres.

In FIG. 1, the components of an embodiment of an electrically heated smoking device 100 are shown in a simplified manner. Particularly, the elements of the electrically heated smoking device 100 are not drawn to scale in FIG. 1. Elements that are not relevant for the understanding of this embodiment have been omitted to simplify FIG. 1.

The electrically heated smoking device 100 comprises a housing 10 which receives an aerosol-forming substrate 12 in a smoking article, for example a cigarette. Within the housing 10 there is a heater 14 and an electrical energy supply 16, for example a rechargeable lithium ion battery. A microcontroller 18 is connected to the heating element 14, the electrical energy supply 16, and a user interface 20, for example a button or display, or both a button and a display. The microcontroller 18 has embedded software to control the power supplied to the heater 14 in order to regulate its temperature. The aerosol-forming substrate 12 is pushed inside a cavity in the housing 10 to come into thermal proximity with the heater 14. The aerosol-forming substrate 12 releases a range of volatile compounds at different temperatures. By controlling the maximum operation temperature of the electrically heated smoking device 100 to be below the release temperature of some of the volatile compounds, the release or formation of these smoke constituents can be avoided. Typically the aerosol-forming substrate is heated to a temperature of between 250 and 450 degrees centigrade.

An image sensing module 40 is also connected to the microcontroller, as will be described. The microcontroller 18 controls the power supplied to the heating element dependent on the data from the image sensing module following insertion of a smoking article into the device, as will be described.

Figure 2:
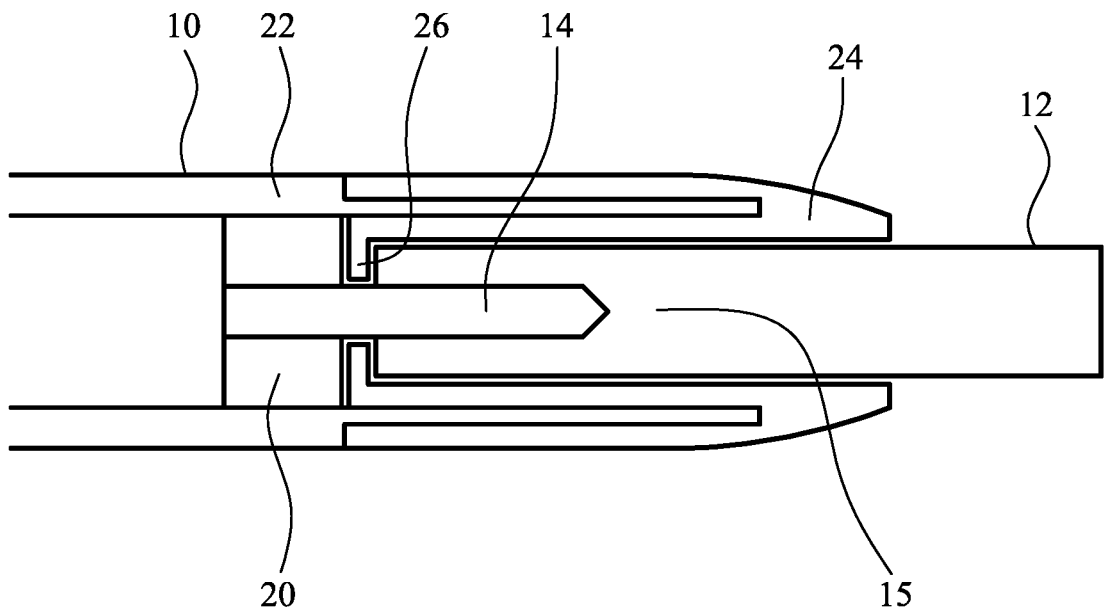
FIG. 2 is a cross section of a front end of a device of the type shown in FIG. 1.

FIG. 2 is a cross-section view of a front end of a device of the type shown in FIG. 1, without a sensing module. A smoking article 12 is received in a cavity 15 in the device. The heater 14 is a ceramic blade which is positioned within the aerosol-forming substrate when the smoking article is received in the cavity 15. The housing 10 has a fixed portion 22 and a front portion 24 which is able to slide relative to the fixed portion. The heater is fixed to a support 20, which is fixed to the fixed portion of the housing 22. The front portion 24 forms a sliding receptacle into which the smoking article is received. The front portion includes a rear surface 26 between the smoking article and the heater support 20. By sliding the front portion away from the fixed portion, towards the open end of the cavity, the smoking article is pulled off the heater 14 by the rear surface 26 and so can be removed from the device easily.

The device shown in FIGS. 1 and 2 is generally cylindrical and elongate so that it can be held easily in one hand, in the same manner as a lit-end cigarette. It is desirable that the device is only marginally wider than the smoking article. Because of that, space for a sensor system for recognising markings on the smoking article is very limited in the front end of the device. It can be seen from FIG. 2 in particular that there is very little space for an imaging system that would provide sufficient optical resolution to distinguish different markings on a smoking article.

Figure 3:
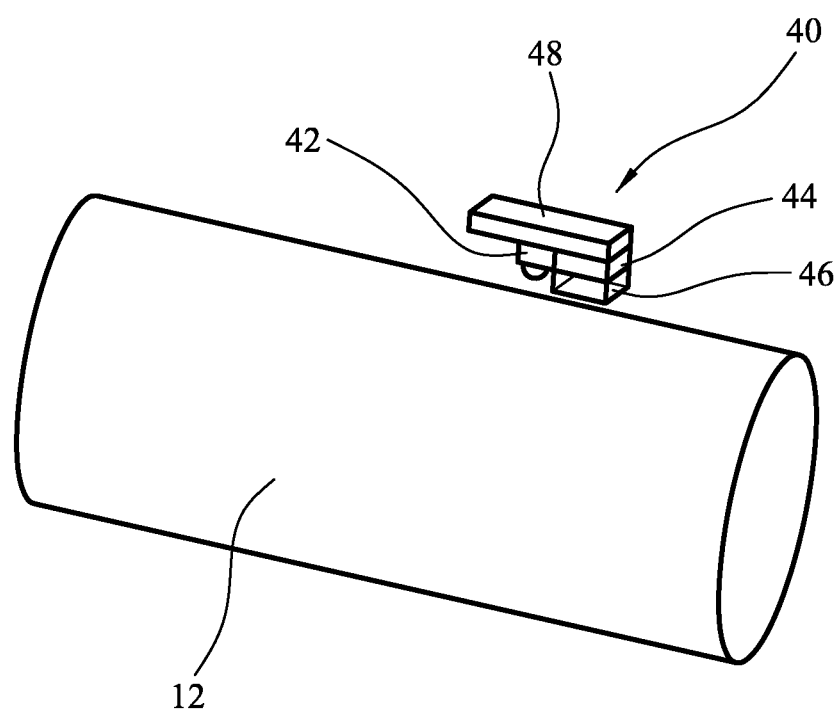
FIG. 3 is a schematic illustration of a sensing system in accordance with the invention.

FIG. 3 is a schematic illustration of a sensing system in accordance with the invention. FIG. 3 shows a circular cylindrical smoking article 12. The sensing system 40 is positioned adjacent the curved external surface of the smoking article. The sensing system comprises a packaged LED 42 mounted on a printed circuit board 48. The sensing system also includes an image detector 44 mounted on the printed circuit board adjacent the LED 42. A plurality of microlenses 46 is mounted on the image sensor.

Figure 4A:
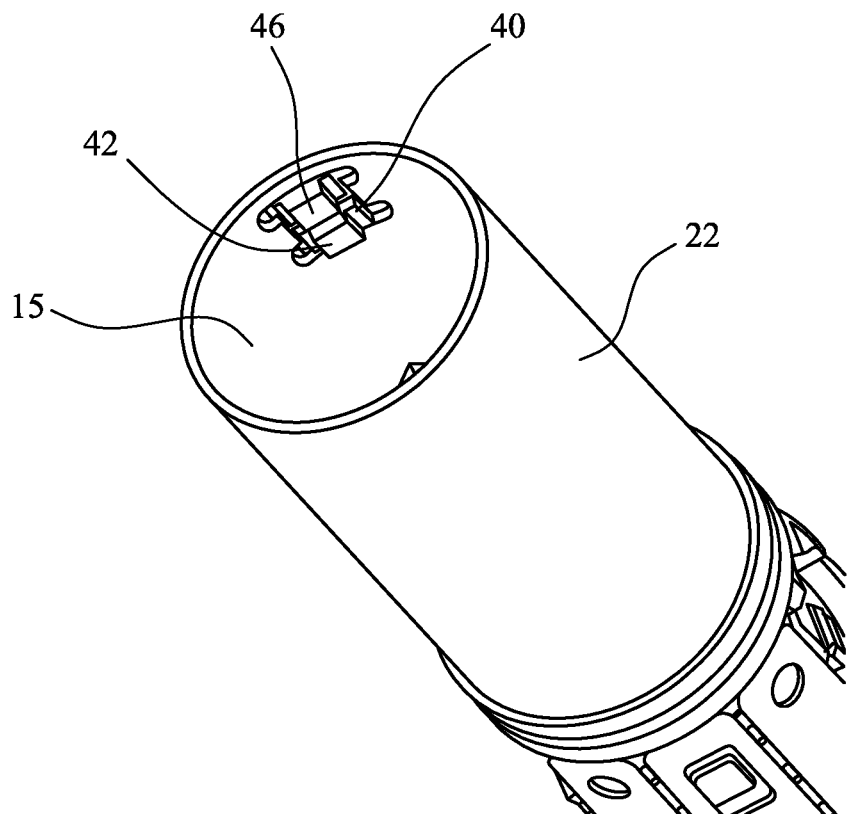
FIGS. 4*a* and 4*b* illustrate the position of the sensing system of FIG. 3 within an electrically operated smoking device.
Figure 4B:
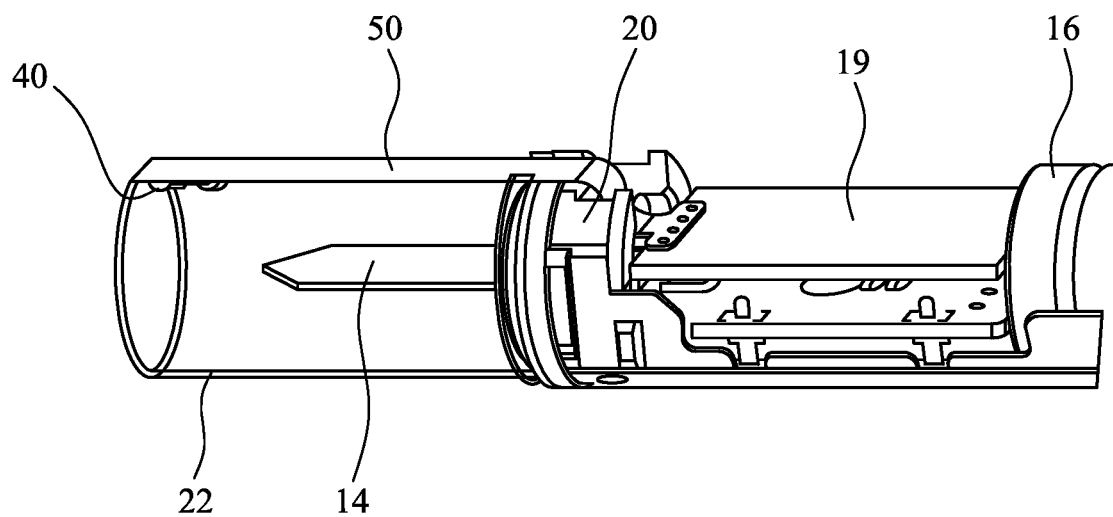

FIGS. 4a and 4b illustrate how the sensing system is positioned within the smoking device. FIG. 4a is a perspective view of a front end of the device, with the front housing removed. It can be seen that the sensing system 40 is mounted on the fixed portion of the housing 22, with the LED 42 and microlenses 46 facing into the cavity 15.

FIG. 4b is a side view of the front end of the device with the fixed housing 22 shown transparent and a main housing and front housing of the device removed. The sensing system 40 is connected to control circuitry 19 including the microcontroller 18 by connector 50. The heater 14, heater support 20 and battery 16 can also be seen. The sensing system 40 is connected to the connector 50 through an aperture in the fixed housing 22. The front housing, as shown in FIG. 2, but not shown in FIGS. 4a and 4b for clarity, and which slides on the fixed housing, also has an aperture formed in it to allow light to pass to and from the sensing system from and to the smoking article.

Figure 5A:
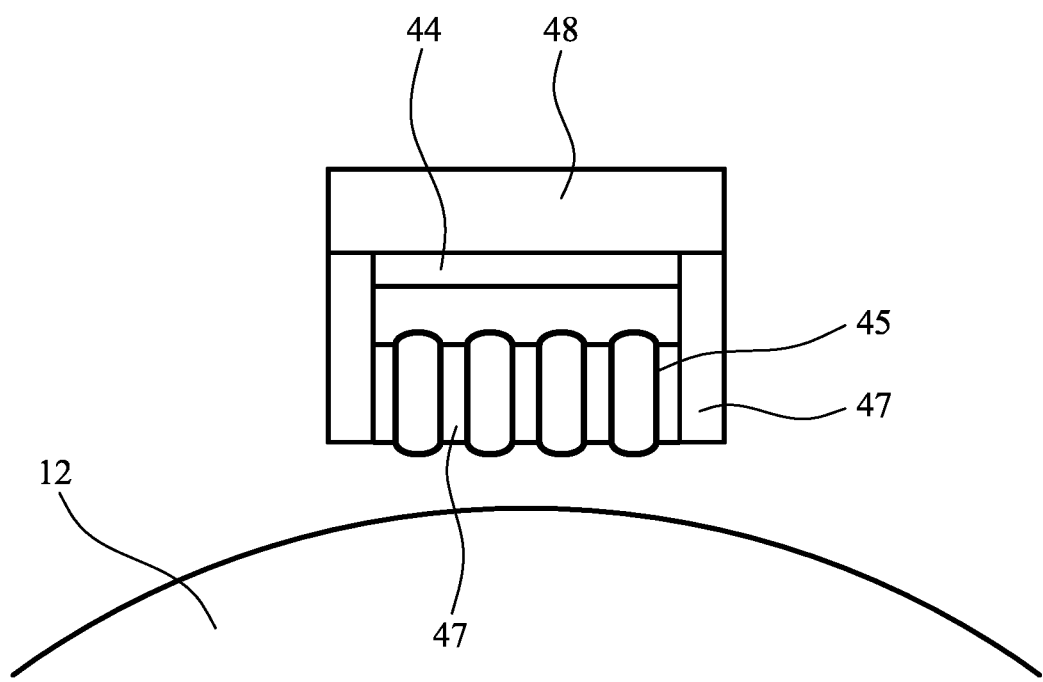
FIGS. 5*a* and 5*b* illustrate an arrangement of microlenses in a sensing system as shown in FIG. 3.
Figure 5B:
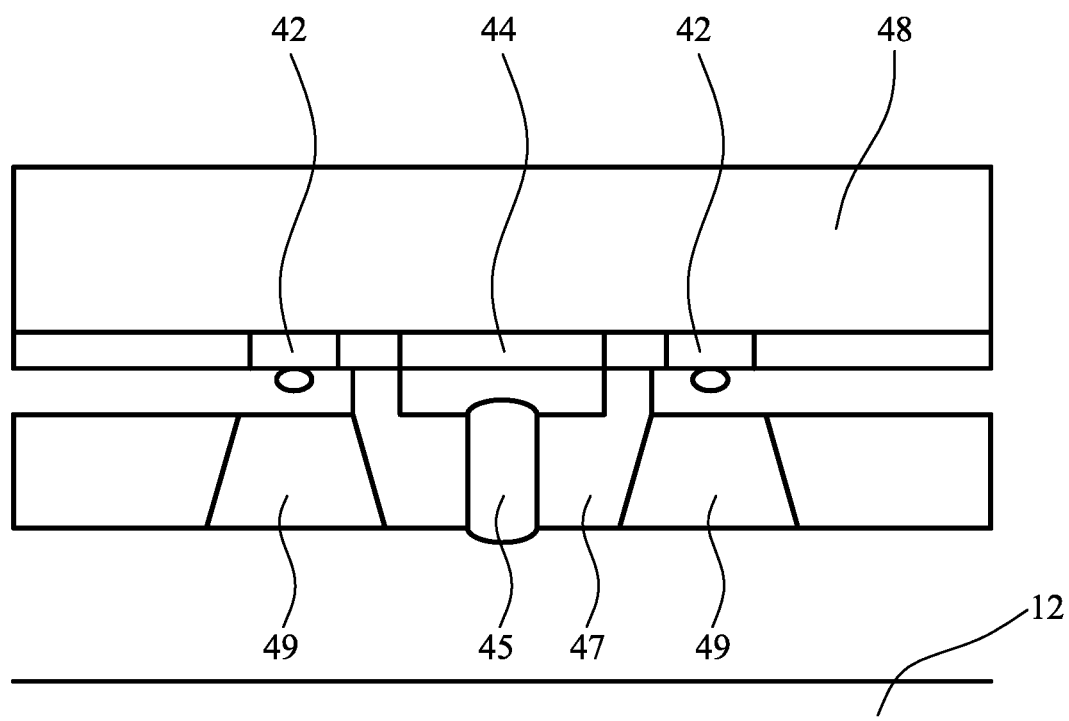

FIGS. 5a and 5b illustrate one example of a sensing system 40 in more detail. FIG. 5a is a cross section across the cavity, showing the curved surface of the smoking article 12. FIG. 5b is a cross section perpendicular to FIG. 5a, along an axial direction of the cavity.

In the embodiment shown in FIGS. 5a and 5b the image detector 44 has a size of 0.3 mm×1.2 mm. There are four microlenses 45, arranged in a one dimensional array to cover the image detector 44. The array of microlenses extends in a direction perpendicular to the axial direction of the cavity. The array of microlenses are held in a support structure 47 fixed to the printed circuit board (PCB) 48. The support structure is formed from an injection moulded plastics material. Transparent light guides 49 are provided in the support structure to guide light emitted by the LEDs 42, which are fixed to the PCB. The number of LEDs used is a balance between power consumption and speed of image detection. More light allows for faster image capture but requires higher power consumption. The use of two LEDs provides adequate illumination. The support structure 47 is opaque and prevents light from the LEDs 42 directly reaching the detector 44 or the lens array 45 without first being reflected from the smoking article 12.

The sensing system is subject to large changes in temperature during its lifetime and so thermal stability is important. Glass materials may be used for the bulk of the optical materials. A thin layer of plastics material may be replicated onto the bulk glass to provide a desired optical performance. The support structure may be formed from a material with high thermal stability.

The indicia on the smoking article are printed on the outer wrapper paper. The wrapper paper is white. The indicia may simply be black markings on the paper, but in a preferred embodiment the indicia include different grey levels. Different grey levels can be generated by varying the dose of ink or by printing in dots that are smaller than the minimum feature size resolvable by the sensing module. The indicia may be a one dimension barcode, with each line in the barcode extending around the perimeter of smoking article so that it can be placed in the cavity in any orientation. Alternatively, a two dimensional barcode may be used, and the microcontroller in the device may include software that is able to determine where the barcode starts and finishes.

The inks used to make the indicia must correspond to the LEDs used in the sensor module. So if the LEDs emit infrared (IR) light, the inks have to be absorb IR light. Equally the lens has to match the wavelength of the light from the LEDs.

The sensing system is connected to a microcontroller 18 in the device, as illustrated in FIG. 1. The microcontroller includes software for correlating image data from the image detector with stored image data relating to one or more types of acceptable smoking articles. Following activation of the device by a user, the microcontroller activates the image sensing module and the image sensing module captures an image of the smoking article in the cavity. The captured image is sent to the microcontroller as image data. The microcontroller 18 correlates the image data with the stored image data relating to one or more types of acceptable smoking articles. If the captured image data does not correlate sufficiently with stored image data then the microcontroller prevents the supply of power to the heater. If the captured image data does correlate sufficiently with stored image data, then the microcontroller permits the supply of power to the heater. The microcontroller may control the power to the heater so that the heater follows a particular temperature profile or power profile, depending on which stored image data the captured image data most strongly correlates to.

The array of microlenses provides a mosaic of inverted images on the detector. The microcontroller 18 may be configured to perform image processing on the mosaic of images to produce a single image for correlating to stored image data. Alternatively, the mosaic of images may be directly compared with stored image data.

It should be clear that, the exemplary embodiments described above illustrate but are not limiting. In view of the above discussed exemplary embodiments, other embodiments consistent with the above exemplary embodiments will now be apparent to one of ordinary skill in the art.

The invention claimed is:

1. An electrically operated smoking device configured to receive a smoking article, comprising:
   a housing defining a cavity configured to at least partially receive the smoking article;
   an image sensing module configured to detect indicia on the smoking article, the image sensing module being disposed on a periphery of the cavity and comprising a light source, an image detector, and a plurality of microlenses held in a support structure, wherein the plurality of microlenses are configured to provide a mosaic of inverted images on the image detector; and
   an opaque shield disposed between the light source and the image detector, the opaque shield being configured to prevent light from the light source directly entering the image detector, without first being reflected by the smoking article.

2. The electrically operated smoking device according to claim 1, further comprising a printed circuit board, wherein the light source and the image detector are both mounted on the printed circuit board.

3. The electrically operated smoking device according to claim 2, wherein the support structure is fixed to the printed circuit board.

4. The electrically operated smoking device according to claim 1,
   wherein the cavity is cylindrical and has an open end through which the smoking article is received and a base at an opposite end to the open end, and
   wherein the image sensing module is disposed on a surface of the cavity between the open end of the cavity and the base.

5. The electrically operated smoking device according to claim 1, wherein the light source comprises a light emitting diode (LED).

6. The electrically operated smoking device according to claim 5, wherein the light source further comprises a plurality of light emitting diodes (LEDs).

7. The electrically operated smoking device according to claim 1, wherein the plurality of microlenses are arranged in a one-dimensional array.

8. The electrically operated smoking device according to claim 7, wherein the one-dimensional array of microlenses is a line of four microlenses.

9. The electrically operated smoking device according to claim 7, wherein the one-dimensional array of microlenses is arranged to extend in a direction perpendicular to an axial direction of the cavity.

10. The electrically operated smoking device according to claim 7, wherein the light source comprises a plurality of light emitters disposed on either side of the one-dimensional array of microlenses.

11. The electrically operated smoking device according to claim 1, further comprising a controller configured to compare image data from the image detector with stored image data.

12. The electrically operated smoking device according to claim 11, wherein the controller is further configured to perform image processing on the mosaic of inverted images to produce a single image for correlating to the stored image data.

13. The electrically operated smoking device according to claim 11, wherein the controller is further configured to control a supply of power to the electrically operated smoking device dependent on an outcome of a comparison between the image data from the image detector and the stored image data.

14. The electrically operated smoking device according to claim 1,
further comprising a sliding receptacle, configured to receive the smoking article, and which is movable towards an open end of the cavity when the smoking article is to be removed,
wherein the sliding receptacle comprises an aperture positioned to allow light from the light source to reach the smoking article.

15. The electrically operated smoking device according to claim 1, wherein the plurality of microlenses are further configured to compensate for curvature of the received smoking article.

16. The electrically operated smoking device according to claim 1, wherein the plurality of microlenses are glass.

17. A smoking system, comprising:
an electrically operated device according to claim 1; and
a smoking article.

18. The smoking system according to claim 17, wherein the smoking article comprises indicia on an outer surface of the smoking article.

* * * * *